Oct. 13, 1964  I. W. JORGENSEN  3,152,767
COLORED LAMP ASSEMBLY
Filed Nov. 23, 1962

INVENTOR.
Irving W. Jorgensen
BY
Barnes, Kisern & Pierce
ATTORNEYS.

United States Patent Office 3,152,767
Patented Oct. 13, 1964

3,152,767
COLORED LAMP ASSEMBLY
Irving W. Jorgensen, 800 River Bend Drive, R.R. 3,
Owosso, Mich.
Filed Nov. 23, 1962, Ser. No. 239,648
2 Claims. (Cl. 240—46.57)

This invention relates to colored lamp assemblies and particularly to a filter and filter holder for converting a white lamp to a colored lamp.

It is an object of the present invention to provide a filter and filter holder for use with white automobile parking and turn signal lights or the like, for causing such lights to emit a colored beam.

It is another object of the present invention to provide a filter and filter holder for use with a lamp assembly which is inexpensive, easily installed, and of durable construction.

These and other objects of the present invention will become apparent from the following detailed description taken in conjunction with the accompanying drawings, wherein.

The American automobile industry has heretofore equipped its automobiles with front parking and signal lights operable to cast a white beam. Recently, the industry has converted to the use of amber front signal and parking lights which are believed to offer certain safety advantages. As a result, many motorists owning automobiles with white parking and turn signal lights also wish to convert to amber. While this may be accomplished by the purchase of new amber colored lamp bulbs or the acquisition of colored lenses for such lights, these items are relatively expensive. The structure of the present invention affords an extremely low cost answer to the conversion problem and utilizes a small molded plastic filter which is held in place in front of the lamp bulb by an inexpensive spring filter holder. The filter and its spring holder are easily assembled and installed on the lamp by anyone with little or no mechanical ability.

Figure 1:
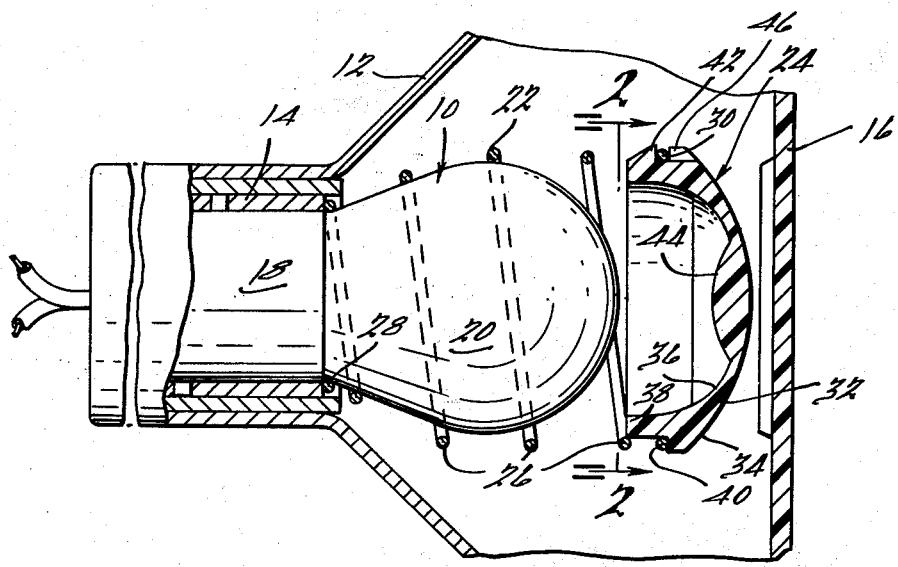
FIGURE 1 is a sectional view through a colored lamp assembly of the present invention.
Figure 2:
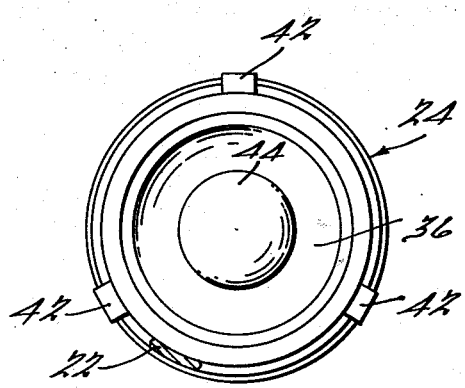
FIG. 2 is a sectional view of the structure illustrated in FIG. 1 taken along the line 2—2 thereof.

Referring now to the drawings, FIGURE 1 illustrates a white lamp bulb 10 in association with a reflector 12 having a centrally located socket 14. A lens 16 is positioned in front of the lamp and is adapted to be secured to the reflector 12 by any suitable fastening means (not shown). The lamp bulb 10 has a base 18, which is received within the socket 14, and a clear transparent glass bulb portion 20. The structure described thus far comprises a standard lamp assembly such as that forming the parking or turn signal lights of an automobile. For the purpose of converting this lamp assembly to a unit operable to cast a colored beam (as, for example, an amber beam) a filter holder 22, in the form of a helical wire spring, is positioned around the bulb portion 20 and carries on its forward end a one-piece molded plastic filter 24. The spring filter holder 22 extends from a position adjacent the end of the socket 14 to a position disposed forwardly of the forward end of the bulb portion 20. The major portion of the length of the spring filter holder 22, including the forward portion thereof, is of constant diameter as exemplified by the convolutions 26. The end of the spring filter holder 22 adjacent the socket 14 is of reduced diameter as shown at a convolution 28. The portion of the filter holder 22 between the convolution 28 and the next adjacent one of the convolutions 26 is of tapering diameter, substantially conformed to the taper of the adjacent surface of the bulb portion 20. The end convolution 28 (which is annular) is of an inside diameter substantially equal to the diameter of the small end of the bulb portion 20 adjacent the base 18. The convolutions 26 are of an inside diameter just slightly greater than the maximum diameter of the bulb portion 20. It will be seen that the lamp is oriented so that the axis of the spring filter holder 22 is horizontally disposed. Thus, the convolutions of the spring filter holder 22 rest on the bulb portion 20 to support the filter 24. The spring filter holder 22 is restrained from movement in the direction of its axis by its engagement with the socket 14 and by its engagement with the outer surface of the bulb portion 20 which tapers in a radially outwardly diverging conical path away from its base 18. The spring filter holder 22 has a substantially annular end convolution 30 at its forward end for the purpose of connection to the filter 24.

The filter 24 is formed with a main central concavo-convex portion 32 which has a forward convex surface 34 and a rearward concave surface 36. A sleeve portion 38 is integrally connected to the concavo-convex portion 32 and extends rearwardly therefrom. The outside diameter of the sleeve portion 38 is less than that of the concavo-convex portion 32, resulting in an annular radially extending shoulder 40 therebetween. A plurality of bosses 42 project radially outwardly from the sleeve portion 38 at spaced locations around the circumference thereof. The bosses 42 are spaced rearwardly slightly from the shoulder 40 to accommodate the spring convolution 30 between the bosses 42 and the shoulder 40. The rear surfaces of the bosses 42 are radially outwardly and forwardly inclined to facilitate the assembly of the filter 24 to the spring filter holder 22. The concavo-convex filter portion 32 is formed with a central concave portion 44 at the center of its rear side which is in confronting relation with the forward end of the bulb portion 20. It will also be noted that recesses 46 are formed on the outside surface of the filter 24 forwardly of the bosses 42. These recesses are merely the result of the formation of the bosses 42 in the molding process.

While the rearward side of the filter 24 is somewhat bowl-shaped, it is not necessary that the bulb portion 20 be received therein and, in fact, the filter 24 is illustrated as being positioned slightly forward of the bulb portion 20. In this position the filter 24, which is of amber hue, (or other desired color) will filter the light passing therethrough so that the portion of the beam passing through the filter will be of amber color. However, it will be seen that the filter is not in the path of all light passing through the lens 16 from the reflector 12. However, some of the light which travels directly from the bulb 10 to the filter 24 is reflected off of the rearward surface of the filter 24 back onto the reflector 12 where it merges with the white light reflected off of the reflector 12. The concave protrusion 44 is particularly effective in reflecting amber light back onto the reflector 12. By this means it is not necessary to make the filter 24 so large as to be coincident in size with the lens 16 and a filter 24 of much smaller size may be used. While some white light is merged with the amber light cast from the lamp assembly, the composite result gives the impression of amber or whatever other color filter is used.

Figure 3:
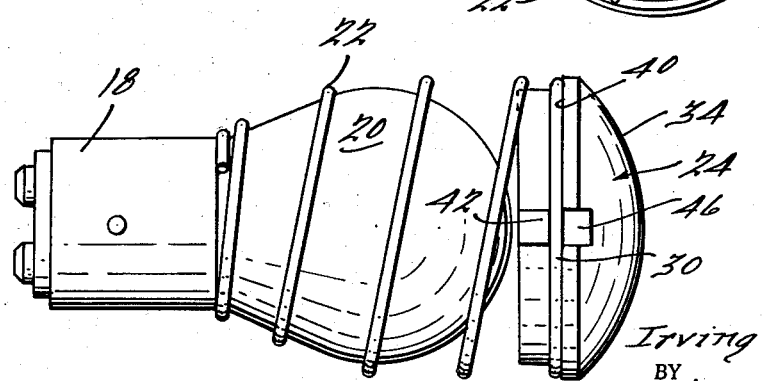
FIG. 3 is a plan view of the bulb, filter and filter holder illustrated in FIG. 1.

It is intended that the spring filter holder 22 and filter 24 will be sold in kits for installation on white lamp assemblies, thereby converting the same to colored lamp assemblies. The filter 24 and spring filter holder 22 are installed by first removing the lens 16. Next, the bulb 10 is removed from its socket 14 and inserted through the spring from the large diameter end thereof, so that the base 18 in the lamp 10 projects through the small diameter end of the spring. Next, the convolution 30 at the large diameter end of the spring is snapped over the bosses 42 so as to lie in the groove between the bosses 42 and the shoulder 40. It will be appreciated that the flexibility of the spring filter holder 22 permits the convolution 30 to be expanded for this purpose. This produces the assembly illustrated in FIGURE 3. Finally, the bulb 10, with the filter 24 and spring filter holder 22 assembled thereto, is re-installed in the socket 14 and the lens 16 is replaced.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A colored lamp assembly including a lamp bulb having a base and a transparent bulb element extending horizontally from said base, said bulb element being provided with a small diameter portion adjacent said base and a large diameter portion spaced from said base, a horizontally extending helical spring encircling said transparent bulb element and having a portion at one end thereof adjacent said base of a diameter less than said large diameter bulb portion and a filter carried at the other end of said spring, said filter having confronted abutment means spaced axially of said spring and extending radially of the axis of said spring receiving a convolution of said spring therebetween at the end of said spring opposite from said base.

2. A colored lamp assembly including a lamp bulb having a base and a transparent bulb element extending horizontally from said base, said bulb element being provided with a small diameter portion adjacent said base and a large diameter portion spaced from said base, a horizontally extending helical spring encircling said transparent bulb element and having a portion at one end thereof adjacent said base of a diameter less than said large diameter bulb portion and a filter carried at the other end of said spring, said filter having spaced abutment means spaced apart in a direction parallel to the axis of said spring, said abutment means being located on the outer periphery of said filter and defining therebetween a radially outwardly open groove receiving a convolution of said spring at the end of said spring opposite from said base.

References Cited in the file of this patent
UNITED STATES PATENTS

| | | |
|---|---|---|
| 1,960,148 | Gage | May 22, 1934 |
| 2,623,989 | Lehmann | Dec. 30, 1952 |
| 2,644,883 | Schoenherr | July 7, 1953 |